July 16, 1940.　　　H. M. SARGENT　　　2,207,824
FOOTREST AND PEDAL EXTENSION FOR PIANOS
Original Filed Oct. 31, 1936
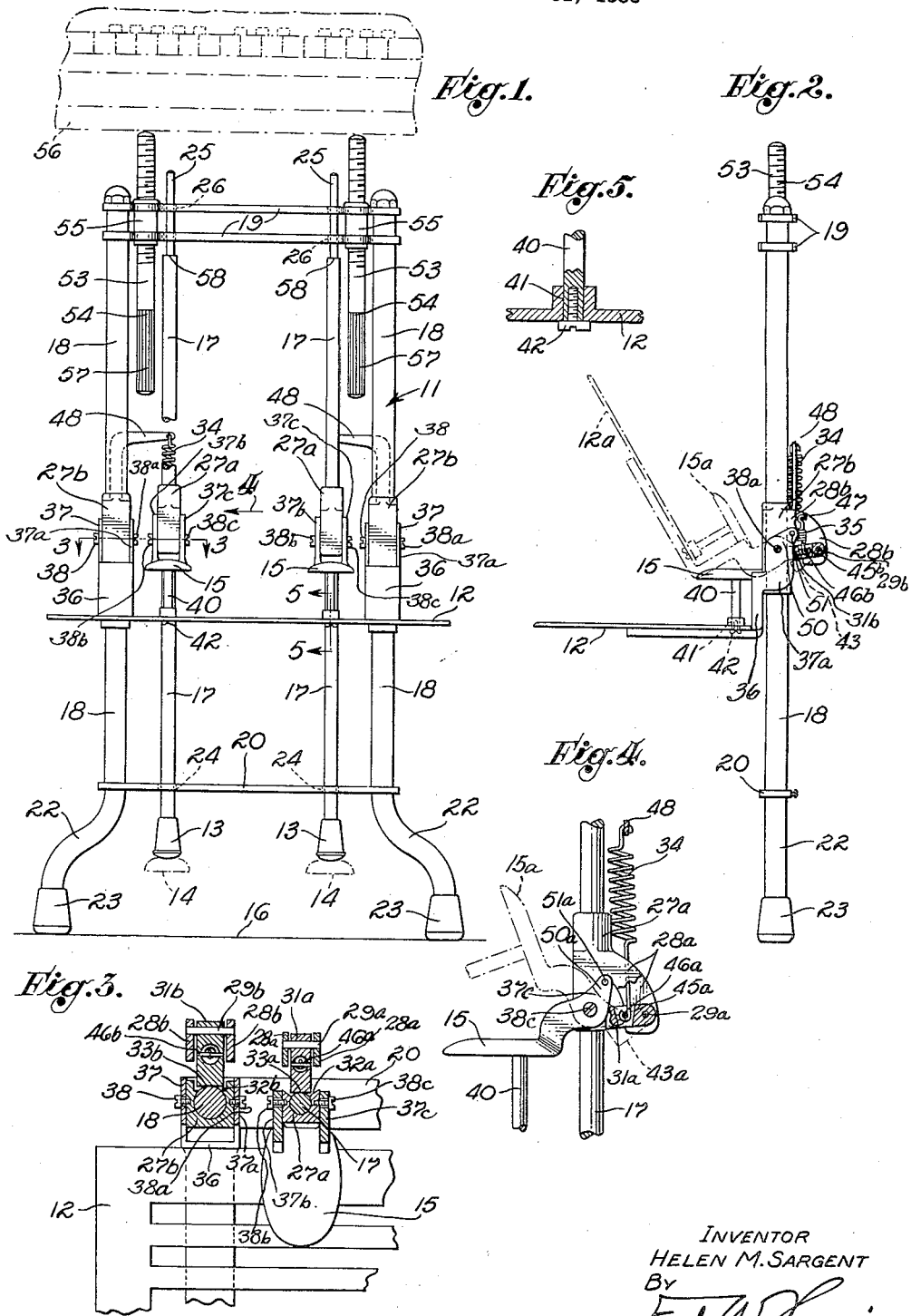
INVENTOR
HELEN M. SARGENT
BY
ATTORNEY.

Patented July 16, 1940

2,207,824

UNITED STATES PATENT OFFICE 2,207,824

FOOTREST AND PEDAL EXTENSION FOR PIANOS

Helen M. Sargent, Wilmette, Ill.

Refiled for abandoned application Serial No. 108,563, October 31, 1936. This application October 11, 1939, Serial No. 298,992

11 Claims. (Cl. 84—232)

My invention relates to a device adapted to be placed at the front of a musical instrument of the character of a piano, this device having a footrest in raised relation to the floor and also means whereby the piano pedals may be operated by the feet of a player which are normally supported on the footrest.

The invention is of especial usefulness to children and persons of small stature. In the teaching of piano playing to children the use of the pedals is often delayed as the result of the inability of the pupil to reach the pedals when seated on a chair or piano bench in a normal manner. Likewise, the child student will often sit at the piano with legs dangling, a condition which is not conducive to good posture and in many instances results in considerable discomfort and nervous strain on the pupil which may in some instances interfere with the pupil's progress. It is an object of my present invention to provide a footrest for the feet of a person of small stature seated at the piano at a proper height to give the correct position of the arms and hands relative to the keyboard, so that correct posture of the person may be readily achieved with such ease and comfort being present as to enable the person to devote his entire attention to playing or practice at the piano.

It is a further object of the invention to provide a device of the above character which is portable and may be readily secured in operative position at the front of the piano or similar musical instrument without the use of screws or bolts which make threaded engagement with the piano structure, and which does not require the use of tools to fix it in operative position relative to the piano.

It is a further object of the invention to provide an attachment of the above character having pedal operating means in predetermined positions relative to the footrest, and it is a further object of the invention to provide a simple means for adjusting the footrest to different heights to suit the user, and to have in conjunction therewith a means for automatically moving or adjusting the pedal operating means to positions corresponding to the positions of the footrest.

It is a further object of the invention to provide a device of the above character which is not only simple in character and construction but is of such artistic appearance that it will not detract from the appearance of the piano with which it is used.

Further objects and advantages of the invention will be brought out throughout the following part of the specification.

Referring to the drawing, which is for illustrative purposes only:

Fig. 1 is a front elevation of a preferred form of my invention.

Fig. 2 is a side elevation thereof.

Fig. 3 is an enlarged fragmentary cross section taken as indicated by the line 3—3 of Fig. 1.

Fig. 4 is an enlarged fragmentary view, partly in section, taken as indicated by the arrow 4 of Fig. 1.

Fig. 5 is an enlarged fragmentary section taken as indicated by the line 5—5 of Fig. 1.

The preferred form of the invention shown in the drawing includes a supporting element 11 having a footrest 12 carried thereon and having pedal engaging members 13 adapted to rest upon the piano foot pedals 14, shown in dotted lines, when the supporting element 11 is placed in operative position at the front of the piano. The device likewise has foot pedals 15 spaced above the footrest 12 in a relation thereto substantially the same as the relation of the piano pedals 14 to the floor 16. The members 13 are connected to the foot pedals 15 by pedal extensions 17 which are supported in such a manner that when either of the foot pedals 15 is forced downwardly, the corresponding piano pedal 14 will be depressed, thereby making it possible for the piano player with his feet positioned on or above the footrest 12 to readily operate the piano pedals 14 through the medium of the foot pedals 15 of my device.

The supporting element 11 comprises a pair of vertical bars 18 connected in spaced relation by means of upper connecting bars 19 and a lower connecting bar 20. The lower portions of the vertical bars 18 may be bent outwardly or spread apart as shown at 22 so as to assure ample clearance for the piano pedals 14, and the lower extremities of the bars 18 may be provided with feet 23 which may be made of rubber, if desired. The extensions 17 likewise consist of bars which are extended vertically or in parallel relation to the bars 18, the lower ends of the members 17 being slidable through openings 24 in the lower connecting bar 20, and the upper ends of the bars 17 being provided with stems 25 of reduced diameter which pass through openings 26 in the upper connecting bars 19 and are slidable in such openings.

Slidable respectively on the vertical bars 17 and 18 are sleeves 27a and 27b, these sleeves being the same in general character but being of two different sizes owing to the differences of diameter of the bars 17 and 18. The sleeves 27a and 27b are square in cross section at their lower portions and circular at their upper portions. Each of the sleeves 27a has a pair of arms 28a projecting rearwardly from intermediate portions thereof and curving downwardly as best shown in Fig. 4. Each of the sleeves 27b has a pair of arms 28b projecting rearwardly from intermediate portions thereof and curving downwardly as best shown in Fig. 2. These arms 28a and 28b are spaced apart in parallel vertical planes so as to carry horizontal pins 29a and 29b respectively, which support the rearward ends of locking levers or dogs 31a and 31b respectively, the dogs 31a being employed with the sleeves 27a and the larger dogs 31b being employed with the sleeves 27b. The lower rearward portions of the sleeves 27a and 27b, as best shown in Figs. 4 and 2 respectively, are cut away to provide recesses or openings 32a and 32b respectively, whereby the members 17 and 18 respectively will be exposed so that the inner ends 33a and 33b of the dogs 31a and 31b, respectively may engage the bars 17 and 18 respectively when the members 31a and 31b respectively are pulled upwardly by springs 34 and 35 respectively shown in Figs. 4 and 2. The dogs 31a and 31b may engage the bars 17 and 18 as they approach horizontal positions, and due to the fact that they are at this time nearly perpendicular to the bars 17 and 18, the respective ends 33a and 33b thereof exert great pressure against the bars and lock the sleeves 27a and 27b against downward movement.

The footrest 12 comprises a rectangular plate and has a pair of brackets 36 at the rearward portion thereof for pivotal engagement with the sleeves 27b. Each of the brackets 36 has a pair of rearwardly extending vertical plates 37 and 37a spaced apart so as to pass on opposite sides of the squared portion of the sleeves 27b cooperating therewith, and pivot means are provided in the form of two screws 38 and 38a passing through openings in the plates 37 and 37a, and being threaded into opposite sides of the sleeves 27b. Accordingly, the footrest 12 may be swung upwardly from the position in which it is shown in full lines in Fig. 2 to its dotted line position 12a.

The foot pedals 15 have vertical plates 37b and 37c projecting rearwardly therefrom on opposite sides of the sleeves 27a, and pivot means for the foot pedals 15 are provided in the form of small screws 38b and 38c, which pass through openings in these last named plates 37b and 37c into threaded engagement with opposite sides of the sleeves 27a. To provide a connection of the foot pedals 15 with the footrest 12 so that movement of the footrest 12 into raised position such as shown at 12a will result in the swinging of the foot pedals 15 into raised positions as indicated by dotted lines 15a, vertical bars 40 are extended downwardly from the foot pedals 15 through vertical openings 41 in the footrest 12, there being stops formed on the lower ends of the bars 40 by suitable means such as screws 42 which are threaded upwardly into the lower ends of the bars 40. When the footrest 12 is in horizontal position, the vertical bars 40 may move downwardly through the openings 41 when the pedals 15 are pressed down, but the engagement of the bars 40 with the openings 41 serves to keep the pedals 15 in parallel relation to the footrest 12, the result being that when the footrest 12 is swung upwardly, the pedals 15 will be likewise rotated upwardly on their pivot screws 38b and 38c.

The purpose of the provision for swinging the footrest 12 and the foot pedals 15 upwardly is to provide a simple means whereby the dogs 31a and 31b may be swung downwardly into disengaged position such as shown for dogs 31a by dotted lines 43a in Fig. 4, whereupon the sleeves 27a and 27b and the parts 12 and 15 pivotally secured thereto may be moved on the bars 17 and 18 to a new position of adjustment. It will be noted that the dogs 31a and 31b, as shown in Figs. 4 and 2, have vertical openings 45a and 45b respectively therein across which horizontal pins 46a and 46b are extended for engagement with the lower ends of the springs 34 and 35 respectively. The springs 35 are relatively short, and, as shown in Fig. 2, the upper ends thereof are secured to pins 47 disposed between the upper portions of the plates 28b which project rearwardly from the sleeves 27b. The springs 34 are larger than the springs 35, and in addition to the function of rotating the dogs 31a upwardly, have the purpose of applying a lifting force to the sleeves 27a whereby the foot pedals 15 will be yieldably held in raised position or in an upwardly spaced relation to the footrest 12 determined by the stops 42 on the lower ends of the bars 40. The upper ends of the springs 34 are connected to arms 48 which project upwardly from the rearward portions of the sleeves 27b and are bent inwardly behind the bars 17 as shown in Figs. 1 and 2.

It will be noted that the screws 38, 38a, 38b, and 38c are axially aligned when the sleeves 27a and 27b are in the positions in which they are shown in Fig. 1. Therefore, at this time the parts 12 and 15 may be rotated upwardly freely and in unison. Each of the plates 37, 37a is provided with an upwardly and rearwardly extending lever portion 50, and between each pair of these levers 50 a small rod 51 is extended, the position of such rod being in each instance between a sleeve 27b and the arms 28b which project rearwardly therefrom. Each of the plates 37b, 37c is provided with an upwardly and rearwardly extending lever portion 50a, and between each pair of these levers 50a a small rod 51a is extended, the position of such rod being in each instance between a sleeve 27a and the arms 28a which project rearwardly therefrom. The pins or rods 51, 51a are likewise in such position that when the footrest 12 and the foot pedals 15 are rotated upwardly as shown by dotted lines 12a and 15a in Fig. 2, the pins 51, 51a will engage the upper forward portions of the dogs 31b and 31a respectively, and rotate such dogs 31b, 31a downwardly into released positions such as indicated by dotted lines 43 and 43a respectively in Figs. 2 and 4. Therefore, all of the dogs 31b, 31a will be simultaneously released so that at the time the footrest 12 is in raised position, the sleeves 27a, 27b may be moved upwardly or downwardly on the bars 17 and 18 respectively to a desired new position. Then, when the footrest 12 is again swung downwardly into the horizontal position in which it is shown in Figs. 1 and 2, and the foot pedals 15 are likewise swung, the upward rotation of the levers 50, 50a will remove the pins 51, 51a from engagement with the dogs 31b, 31a respectively and permit the springs 35 and 34 to swing the dogs 31b, 31a respectively into their latched or locked positions in which they are shown in full lines in Figs. 2 and 4, thereby locking the footrest 12 in its new position of use and likewise locking the sleeves 27a on the bars 17 so that when the foot pedals 15 are pressed downwardly, the bars 17 will be likewise moved downwardly, depressing the piano pedals 14. When the device is in adjusted or operative position as shown in full lines in Figs. 1 and 2, the springs 34 will likewise support the bars 17 owing to the fact that these bars are at this time locked to the sleeves 27a.

I provide a simple means for securing the device 11 in operative position at the front of the piano, including screw means 53, preferably consisting of a pair of laterally spaced vertical screws 54 supported in threaded sleeves 55 in such a manner that they may be screwed upwardly into engagement with the lower part of the keyboard supporting structure 56 of a piano, the general character of such keyboard supporting structure being shown in dotted lines in Fig. 1. The threaded sleeves are preferably carried by the upper connecting bars 19, and the lower portions of the screws 54 are preferably knurled as shown at 57 so that they may be readily rotated so as to be screwed upwardly or downwardly through the sleeves 55. A manner of placing the device in operative position at the front of the piano is as follows. The bars 17 are first adjusted to their highest positions, that is, so that the shoulders 58 at the upper ends thereof will be brought into engagement with the lower of the two bars 19. Then, with the footrest 12 in a position perpendicular to the bars 17 and 18, the device is moved inwardly relative to the piano in a manner to bring the feet 13 at the lower ends of the bars 17 to positions above the piano pedals 14. The screws 54 are then rotated so as to move them upwardly into tight engagement with the lower portion or under face of the keyboard supporting structure 56 of the piano, after which the footrest 12 may be raised into the position in which it is shown in dotted lines in Fig. 2, to release the latches 31a, 31b whereupon the bars 17 may slide downwardly into engagement with the piano pedals 14 as shown in Fig. 1. Thereafter, the adjustment of the footrest 12 and the foot pedals 15 to the desired height may be accomplished in the manner previously described herein.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. In a footrest and pedal extension for pianos, the combination of: a supporting element adapted for placement at the front of a piano, said supporting element comprising a first member horizontally movably supported upon the floor and a second member adjustable with respect to said first member and provided with a contacting face disposed at such an elevation that said face is adapted to engage the keyboard supporting structure of the piano; a footrest carried on said supporting element; and piano pedal extensions movably supported by said supporting element in positions to engage the pedals of the piano, said pedal extensions having foot pedals connected thereto in operative relation to said footrest.

2. In a footrest and pedal extension for pianos, the combination of: a supporting element adapted for placement at the front of a piano, said supporting element having foot means at the lower end thereof for engaging the floor and movable clamping means adjustably mounted on said supporting element and adapted to be moved upwardly into clamping engagement with the underside of the keyboard supporting structure of the piano; a footrest adjustably carried on said supporting element and adjustable to different heights relative to the floor; lock means associated with said footrest and movable to engage said supporting element for locking said footrest relative to the supporting element at different heights; and means movable with said footrest and automatically engaging said lock means when upward movement is manually imparted to said footrest to move said lock means into released position whereby said footrest is freely movable relative to said supporting element.

3. In a footrest and pedal extension for pianos, the combination of: a supporting element comprising a pair of fixedly related vertical legs and means for securing the same in operative position at the front of a piano; a pair of extension bars vertically and slidably mounted on said supporting element in such position that the lower ends thereof will engage the pedals of the piano; a sleeve slidable on each of said legs; a sleeve slidable on each of said bars; a locking dog pivotally mounted on each of said sleeves slidable on said legs so as to swing into locking engagement with said legs; a locking dog pivotally mounted on each of said sleeves slidable on said bars so as to swing into locking engagement with said bars; spring means associated with each of said dogs normally holding the dogs in locking position; a footrest pivoted to said sleeves slidable on said legs so as to be swung from a horizontal position to a raised position; foot pedals pivoted on said sleeves slidable on said bars; and releasing levers associated with said footrest and said foot pedals so as to be moved when said footrest is swung from said horizontal position to said raised position, said levers engaging said locking dogs to move said dogs from engagement with said legs and said bars so that said footrest and said foot pedals are freely movable relative to said supporting element.

4. In a footrest for pianos, the combination of: a supporting element having a vertical guide means; block means slidable on said guide means; a footrest pivoted to said block means so as to swing from a forwardly projecting position to an angular position; a locking cam carried by said block means and movable from a position normally engaging said guide means in wedging relation therewith into a position in which said block is free to slide on said guide means; and a release member connected to move with said footrest and adapted to engage said cam and move it out of said wedging relation with said guide means.

5. In a footrest and pedal extension for pianos, the combination of: a supporting element adapted to be operatively positioned at the front of a piano, said supporting element having vertical guide means; block means slidable on said vertical guide means; a footrest pivoted on said block means so as to be swung from a forwardly projecting position to an upwardly angled position; locking means carried by said block means and movable to engage said guide means in locking relation therewith; a first release member connected to move with said footrest and adapted to engage said locking means and move it out of locking relation with said guide means; a bar member vertically movable on said supporting element in a position to engage a piano pedal; a body slidable on said bar member; a foot pedal supported by said body; a body locking means carried by said body and movable to engage said bar means in locking relation therewith; and a second release member connected to move with said footrest and adapted to engage said body locking means and move it out of said locking relation with said bar member.

6. In a footrest and pedal extension for pianos, the combination of: a supporting element adapted for placement at the front of a piano, said supporting element comprising a first member horizontally movably supported upon the floor and a second member vertically adjustable with respect to said first member and provided with a horizontal contacting face disposed at such an elevation that said face is adapted to be thrust upward in clamping engagement with an underface of the keyboard supporting structure of the piano; a footrest carried on said supporting element; and piano pedal extensions movably supported by said supporting element in position to engage the pedals of the piano, said pedal extensions having foot pedals connected thereto in operative relation to said footrest.

7. In a footrest and pedal extension for pianos, the combination of: a supporting frame; a footrest secured thereto; a pedal extension movably mounted on said frame and adapted to contact and operate the piano pedal; resilient means interposed between said frame and said extension for yieldably holding said extension in inoperative position; and a foot pedal operatively connected to said extension.

8. In a footrest for pianos, the combination of: a supporting frame detachable from the piano; a releasable clamping block vertically adjustably mounted on said frame; a footrest movably mounted on said block; and releasing means for said clamp operatively connected to said movable footrest.

9. In a footrest and pedal extension for pianos, the combination of: a supporting frame detachable from the piano; a pedal extension movably mounted on said frame; a releasable clamping block vertically adjustably mounted on said pedal extension; a foot pedal movably mounted on said clamping block; and releasing means for said clamp operatively connected to said movably mounted foot pedal.

10. In a footrest and pedal extension for pianos, the combination of: a supporting frame detachable from the piano; a pedal extension vertically freely slidably mounted on said frame and having a foot adapted to contact the piano pedal; a footrest vertically adjustably mounted on said frame; a foot pedal vertically adjustably mounted on said extension; and a connecting means between said footrest and foot pedal, additional to said frame and extension, and movable with said foot pedal and footrest, and adapted to control the vertical spaced relationship of said foot pedal and said footrest.

11. In a footrest and pedal extension for pianos, the combination of: a vertically disposed supporting frame; a first releasable clamp vertically slidably mounted on said frame; a footrest pivoted to said clamp on a first horizontal axis; a vertically disposed pedal extension vertically slidably mounted on said frame and adapted to contact the piano pedal; a second releasable clamp vertically slidably mounted on said extension; a foot pedal pivoted to said second clamp on a second horizontal axis in the same vertical plane with said first horizontal axis; vertically disposed resilient supporting means carried by said first clamp and secured to said second clamp and yieldably supporting said second clamp; means for limiting the upward movement of said extension relative to said footrest to a position in which said horizontal axes are in horizontal alignment; means securing said footrest and said foot pedal together in vertically slidable relationship and for oscillation in unison about their respective pivotal axes when said axes are aligned; and releasing means for said first clamp and releasing means for said second clamp connected to said footrest and foot pedal respectively and adapted to be operated by oscillatory movement of said footrest and said foot pedal respectively.

HELEN M. SARGENT.